United States Patent [19]

Stevens et al.

[11] Patent Number: 5,051,926
[45] Date of Patent: Sep. 24, 1991

[54] SYSTEM WIDE LOCAL COPY MANAGEMENT OF SCREEN COPY PRINTING

[75] Inventors: John D. Stevens, Endicott; Bruce M. Walk, Endwell; John S. Wunder, Apalachin, all of N.Y.

[73] Assignee: International Business Machines Corp., Armonk, N.Y.

[21] Appl. No.: 674,006

[22] Filed: Mar. 25, 1991

[51] Int. Cl.⁵ ............................................ G06K 15/00
[52] U.S. Cl. .................................. 364/519; 364/900; 364/930
[58] Field of Search ............................ 364/518–523, 364/235 MS File, 930 MS File, 940, 940.92, 940.62

[56] References Cited

U.S. PATENT DOCUMENTS

| | | | |
|---|---|---|---|
| 3,573,741 | 4/1971 | Gavril | 364/200 |
| 4,556,959 | 12/1985 | Allen | 364/900 |
| 4,603,385 | 7/1986 | Mueller et al | 364/200 |
| 4,641,263 | 2/1987 | Perlman | 364/900 |
| 4,651,278 | 3/1987 | Herzog et al. | 364/900 |
| 4,713,780 | 12/1987 | Schultz et al. | 364/519 |
| 4,754,428 | 6/1988 | Schultz et al. | 364/519 |
| 4,775,953 | 10/1988 | Goettelmann et al. | 364/900 |
| 4,835,673 | 4/1987 | Rushby | 364/200 |

Primary Examiner—Arthur G. Evans
Attorney, Agent, or Firm—Lynn L. Augspurger

[57] ABSTRACT

With a 370 processing system, such as an IBM Entry Level System 9371, multiple IBM 3151 ASCII Display Stations can be attached with a plurality of I/O processors. A Local Copy Manager is provided for each of the I/O processors to execute. The microcode embodiment emulates a single 3274 Control Unit with a display station attached. Each I/O processor executes the unique Local Copy microcode and intercepts all print keys from each display station, captures the terminal's screen data, and interrupts the 370 processor with a request for service. There may be multiple printers defined. Printing of a hard copy of the screen is output of an operator defined printer demand.

7 Claims, 3 Drawing Sheets

1) USER PRESSES PRINT REQUEST KEY.

2) LOCAL COPY MANAGER INTERCEPTS THIS KEY.

3) LOCAL COPY MANAGER RETRIEVES REQUESTING TERMINAL'S SCREEN IMAGE.

4) LOCAL COPY MANAGER INFORMS 370 PROCESSOR OF LOCAL COPY REQUEST VIA INTERRUPT.

5) 370 PROCESSOR REQUESTS LOCAL COPY MANAGER'S "SCREEN IMAGE."

6) LOCAL COPY MANAGER SENDS KEY STROKE AND REQUESTING TERMINALS SCREEN IMAGE TO 370 PROCESSOR.

7) 370 PROCESSOR CHECKS STATUS OF REQUESTED PRINTER –
   A) IF AVAILABLE, FORMATS THE SCREEN IMAGE INTO A PRINT JOB AND ROUTES TO THE CORRECT PRINTER.
   B) IF UNAVAILABLE, TERMINATES REQUEST.

8) 370 PROCESSOR SENDS COMPLETION STATUS TO LOCAL COPY MANAGER.

9) LOCAL COPY MANAGER ISSUES COMMAND TO CONTROL UNIT TO PRESENT PROPER COMPLETION STATUS TO USER.

FIG.3

SYSTEM WIDE LOCAL COPY MANAGEMENT OF SCREEN COPY PRINTING

FIELD OF THE INVENTION

This application relates to computer systems, and particularly to management of hard copy printing of terminal screen data which could be text or graphics at a printer attached to the system with management being provided without host application intervention.

BACKGROUND OF THE INVENTIONS

There are various text distribution apparatus for distributing text among printers. For instance, reference may be had to U.S. Pat. No. 4,754,428 to T. G. Schultz et al. issued June 28, 1988, which describes a distribution apparatus and method for distributing documents to remote sites. This reference allows for the display and printing of the document by devices whose format is different than that of the originating location. The system convert printer signals to data to be transferred to remote location to then to be converted back to printer signals to be used in printing a copy of the original document. However, this reference does not provide any method of generating hard copy output of a selected screen image at any attached printer without host application intervention.

U.S. Pat. No. 4,713,780 to T. G. Schultz et al. issued Dec. 15, 1987 describes a distribution method for distributing and displaying documents at a remote site. This reference allows for the display of the document by devices whose format is different than that of the originating location. The reference converts text data from a document source to a character and position format to be used in redisplaying the document at a remote site. This patent does not generate hard copy output of a selected screen image at any attached printer without host application intervention.

U.S. Pat. No. 4,641,263 to E. H. Perlman et al. issued Feb. 3, 1987 describes a method and apparatus for printing to a remotely attached parallel printer via a parallel port. It provides for parallel to serial data conversion, transmission of the converted data, and conversion from serial to parallel data to be printed at a remotely attached parallel printer. However, this patent does not generate hard copy output of a selected screen image at any attached printer without host application intervention.

U.S. Pat. No. 4,651,278 to A. Herzog et al. issued Mar. 16, 1987 describes a host application to All Points Addressable (APA) printer interface. This patent provides a process for interconnecting an All Points Addressable printer to a host application program, but also does not provide for generating hard copy output of a selected screen image at any attached printer without host application intervention.

U.S. Pat. No. 4,556,959 to W. H. Allen et al. issued Dec. 3, 1985 describes a method of determining and selecting printer options for work stations and printers attached via a Local Area Network (LAN). The patent provides a method for sensing and selecting printer options from a Local Area Network (LAN) attached work station, but also does not provide a method of generating hard copy output of a selected screen image at any attached printer without host application intervention.

U.S. Pat. No. 4,835,673 to R. J. Rushby et al. issued May 30, 1989 describes a method of dynamic allocation of hardware resources on a Local Area Network (LAN) based distributed network. This patent provides a method of sharing resources among processors attached via a Local Area Network (LAN). This patent does not provide any method of generating hard copy output of a selected screen image at any attached printer without host application intervention.

Within IBM, as disclosed by IBM TDB Vol. 32, No. 9A, Feb., 1990, pp. 111-12 entitled PRINTER PASS THROUGH PROTOCOL, it has been proposed to allow a program running on an IBM System/36 to use a printer on a Local Area Network (LAN) attached Personal Computer. However, this technical bulletin does not provide a method of generating hard copy output of a selected screen image at any attached printer without host application intervention. Other IBM publications include IBM TDB Vol. 31, No. 10, Mar., 1989, pp 179-81 entitled USER INTERFACE TO A PRINT FACILITY which describes an interface to be used in the presentation of print facilities to a host application; and also IBM TDB Vol. 31, No. 7, Dec., 1988, pp 260-61 entitled PRINT BUFFERING ALGORITHM describes a method by which printer data can be buffered and CPU time required to process the print job minimized based on printer characteristics, do not show any method of generating hard copy output of a selected screen image at any attached printer without host application intervention.

Similarly, IBM TDB Vol. 20, No. 6, Nov., 1977, pp 2275-77 entitled PRINT AUTHORIZATION MATRIX describes a system by which a display system controller (Control Unit) can be configured so that attached displays can access a particular subset of attached printers. This display/printer association can only be made between devices that are both attached to the same Control Unit. This reference does not provide for generating hard copy output of a selected screen image. This operation can take place only between devices that are both attached to the same Control Unit.

IBM Pat. No. 3,573,741, issued to Bruce D. Gavril Apr. 6, 1971 illustrates a versatile general purpose control unit. It has means for interconnecting two peripheral devices though the control unit without computer activity during data transfer, and eliminates unnecessary interference within the system memory or with the I/O channel. This reference does not provide the local copy of screen function for generating hard copy output of a selected screen image chosen by the operator.

In foreign publications, there are similar deficiencies. Great Britain Patent GB2185607-A, Jul. 22, 1987 describes an apparatus used to connect a terminal to a processor which can be used to offload the processor by performing local computing functions. This U.K. patent does not show any way to generate hard copy output of a selected screen image at any attached printer without host application intervention. European Patent EP-395890-A, Nov. 7, 1990 describes a local print controller which offloads a central print controller.

From a review of these many references it will be seen that there is still a need for a method by which hard copy output of a selected screen image can be generated, regardless of the attachment of the display and printer. Furthermore we have seen that there should be provided as part of the system a way of generating hard copy output of a selected screen image at any attached printer without host application intervention.

We recognized that the IBM 3274 and 3174 Control Units can be connected for data transfer from an IBM 3270 display system to an IBM 328X printer. In this regard reference may be had to the IBM 3270 Information Display System: 3274 Control Unit Description and Programmer's Guide (IBM publication number GA23-0061).

SUMMARY OF THE INVENTIONS

While, within the systems provide by the prior art, for hard copy output of a selected screen image; the operation can take place only between devices that are both attached to the same Control Unit. In order for this operation to take place between any display and printer, host application intervention would be required without our Local Copy function.

These display and printer devices in many office environments with or without a LAN can be attached in any way to the same or different Control Units, I/O processors, or systems. In our system we provide for Local Copy functions to be performed between Control Units on the same processor (the System/370 or equivalent), or between Control Units attached to different processors in a distributed network.

The hard copy operation can take place without intervention by the host application. We have provided a system which may be implemented with a variety of computer systems in which hard copy output of a selected screen image can be generated, regardless of the attachment of the display and printer. Our system provides a method for of generating hard copy output of a selected screen image at any attached printer without host application intervention.

The system which we have developed has as part of the computer system, a main processor, an I/O processor, a plurality of control units attached to said I/O processor, a printer attached at least one of said control units, a plurality of display stations attached to another of said control units, and within the hardware system there is provided a program for reading a display station's screen data and for formatting said screen data into a print job and for routing the print job data to said printer. Within such a system we provide a local copy manager I/O processor microcode control for emulating a display system. The local copy manager I/O microcode means includes as part of the code a way to monitor the activity of each display station coupled to said I/O processor, and a way for intercepting all print keys for each display computer system, and for capturing screen data for each terminal station, and for interrupting said system main processor with a request for print job service.

Our Local Copy manager I/O microcode controls keep a personal unique channel and device address with the main system processor, whereby terminal stations print screen requests are routed by said local copy manager I/O microcode means to the said printer.

Additionally we provide for routing screen data to any printer of the system defined in the PAM, and in a distributed network, with a print to printer defined in an application.

As a result of the described inventions, the user benefits from the use of the system as fewer required printers, reducing total system cost; and there is reduced system configuration complexity; and there is user flexibility to print screen data on the printer of their choice along with the ability to print screen data at a remote site.

These and other improvements are detailed in the following description. For a fuller understanding of the best way we envision of implementing our inventions reference should be made to the following description and the below-described drawings.

BRIEF DESCRIPTION OF THE DRAWINGS

FIG. 2 is a flow chart of the operations called forth in our proposed system, while FIG. 3 is a drawing of pseudo code used to implement the critical operations of local copy in I/O processors for an IBM 9371 processor system.

DETAILED DESCRIPTION OF THE INVENTIONS

Figure 1:
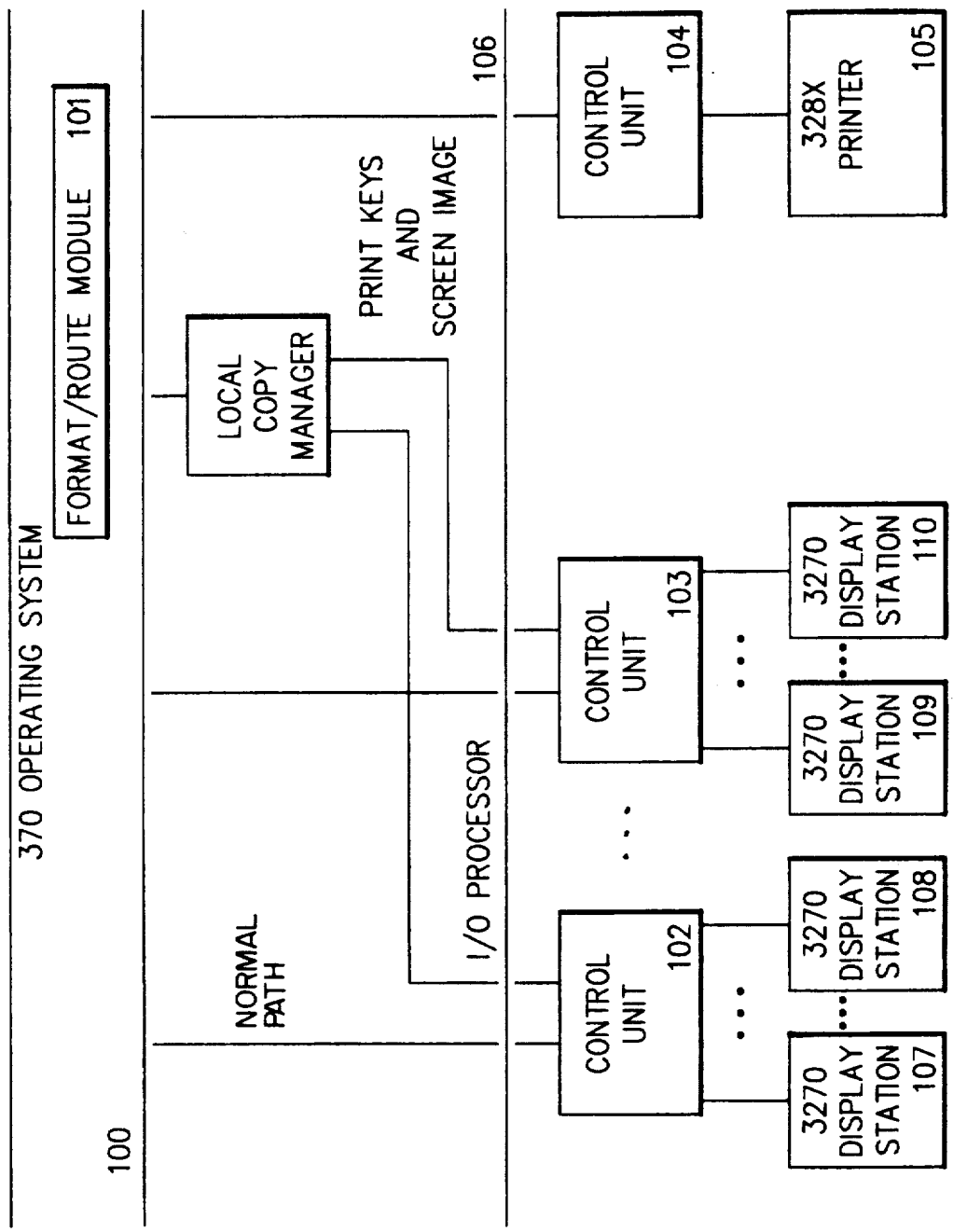
FIG. 1 illustrates our preferred system.

Turning now to the drawings and FIG. 1, it will be seen that in implementing our preferred embodiment we utilized a 370 Operating System environment. The system 100 is provided with 370 application Format and Route support modules 101, with a normal path coupling to several control units 102, 103, and 104 which is the control unit to which a printer 105 in the form of an IBM 328X printer is attached. These paths pass through an I/O processor 106. In our preferred embodiment the I/O processor is provided with unique Local Copy Manager I/O processor microcode as illustrated and discussed with respect to FIG. 2 and FIG. 3. The I/O processor function is provided by either of the IBM 3274 and 3174 Control Units, and allows direct data transfer from a 3270 display station, illustrated by stations 107, 108, 109 and 110 in FIG. 1.

The Local Copy function allows a terminal user to generate a hard copy, such as "print screen", of screen data by capturing the screen image and routing it to a predetermined printer. This is a function similar to that which can be accomplished by a hard switch selector and other hardware with host intervention. With Local Copy the function is initiated by the operator by pressing a key defined as a print key, such as that which exists on an IBM Personal Computer.

The characteristics of the Local Copy function are set up by Control Unit Customization, in which the operator defines a Printer Authorization Matrix (PAM). The PAM defines logical connections between display stations and printers, all of which must be attached to the Control Unit having Local Copy. The PAM allows the operator to define for each display station the printer that will receive the screen image data.

In systems with many attached Control Units, a printer must be attached to each Control Unit in order to allow the Local Copy function to be used by every user. This can prove to be a relatively costly solution for low cost systems. In addition, this does not allow for the system configuration flexibility desired by many users. A preferred solution would be to allow any display station to perform Local Copy operations to any printer, independent of Control Unit attachment. This would reduce total system cost by reducing the number of required printers, and reduce system configuration complexity.

The preferred embodiment is combination of unique I/O processor microcode combined with 370 operating system software that provides the ability to perform Local Copy operations from any display station, to any 328X printer, regardless of how these devices are attached to the 370 processor.

The unique I/O processor microcode, called the Local Copy Manager, emulates a 3270 display station. The Local Copy Manager maintains a unique Channel and Device address, and looks to the 370 processor as if there is a real 3270 display station attached, even though there is no physical device attached.

The Local Copy Manager monitors the activity of all display stations attached to the I/O processor, and intercepts all keys that have been defined as print keys before they are presented to the 370 processor. Upon reception of a print key, the Local Copy Manager will interrogate the control unit to capture the requesting display station's screen image, and then present the screen image to the 370 processor as if the 3270 display station emulated by the Local Copy Manager had its own print key pressed.

When the 370 operating system software receives the print key request from the Local Copy Manager, it will read the display station's data, format it into a print job, and route it to the printer defined as the Local Copy printer for the emulated 3270 display station. This is a function that is already provided by some IBM 370 operating systems, or can be done via a customized 370 application.

It should be recognized that as a result of the inventions the 370 processor will only need to ever receive print keys from one device address, that of the display station emulated by the Local Copy Manager, regardless of the number of real display stations attached to the I/O processor. In addition, by defining multiple print keys, the 370 application can be customized to allow any display station to perform Local Copy operations to any of a number of printers, allowing the user to print screen data on the printer of their choice.

The Local Copy Manager has been implemented on IBM's Entry System 9371 processor, where as a special feature it will prove of special benefit to the growing small business concerned with the desirability of reducing costs and avoiding the need to purchase a printer for each terminal or station.

In our preferred initial embodiment, the IBM 9371 processor attaches multiple IBM 3151 ASCII Display Stations to up to 2 I/O processors. For each 3151 ASCII Display Station attached, the I/O process(s) execute microcode that emulates a single 3274 Control Unit with a single 3278 Model 2 or 3278 Model 5 Display Station attached.

Each I/O processor also executes unique microcode that performs the Local Copy Manager function. This microcode intercepts all print keys from each display station, captures the terminals screen data, and interrupts the 370 processor with a request for service. The 370 processor then determines the cause of the interruption, reads the associated data, and passes this information to the application that "owns" this device (in this case a custom application that will format the data into a print job and route it the printer defined to be associated with that particular print key). For this particular implementation, 2 print keys have been defined, allowing the user to select 1 of 2 printers on which to print the screen data.

For the IBM 9371 implementation, up to 2 printers can be defined as Local Copy printers, and these printers can receive screen data from any display station on the system. The custom 370 application was written as a VTAM application, with 2 versions implemented (one to run on VM operating systems, the other to run on VSE operating systems).

The present system with the improved I/O microcode permits the existing 370 VTAM application to route and operator's screen data to any printer defined to VTAM, and in a distributed network, has been demonstrated to be able to route the job to a printer attached to another processor. This feature can be used to provide hard copy of screen data from a remote site to a central site or vice-versa. This function could be used as an application debugging aid, a method of printing forms remotely, and so on.

Our system for performing Local Copy operations has also been demonstrated using licensed IBM 370 software. The emulated 3270 display station has been defined to VSE/CICS with its terminal control table set up with a "PRINT TO" printer defined. In this case, VSE/CICS performed the formatting of the screen data into a print job and the routing to the printer. This is our current best mode of implementing our inventions.

In both the custom 370 application and VSE/CICS cases, the definition of a printer as a Local Copy printer does not preclude its use as a system printer.

Figure 2:
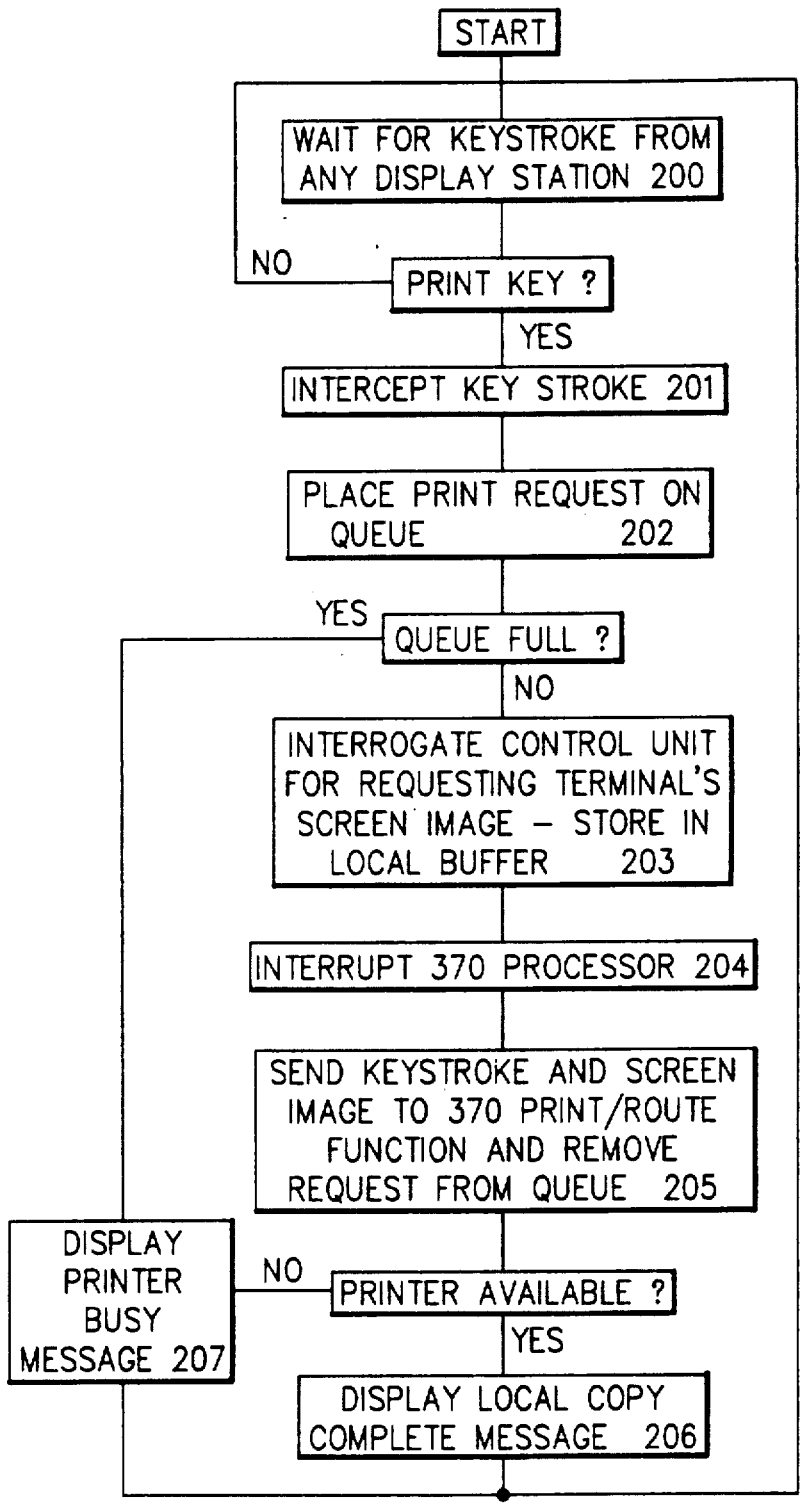

Turning now to FIG. 2. In our preferred embodiment, the unique I/O processor microcode provides a function 200 by which all keystrokes being passed from all display stations to the 370 processor are monitored. Upon detection of a keystroke which signifies a request by the user for a hard copy of their current screen image, the unique I/O processor microcode will then intercept this keystroke 201. The unique I/O processor microcode employs an internal queue 202, which allows for multiple local copy requests to be accepted while a previous request is being processed. The request is placed on the queue if there is room, otherwise a printer busy message is displayed to the user.

When all previous local copy requests have been processed, the unique I/O processor microcode will interrogate the appropriate Control Unit for the user's screen image 203. This screen image is then copied into a local buffer. The 370 processor is then interrupted 204, which in turn responds by requesting the devices keystroke and screen image. The unique I/O processor microcode will then pass the keystroke and screen image to the 370 format and route modules 205.

The 370 processor will then respond to the unique I/O processor microcode with printer availability status. If the printer is available, the normal completion message is presented to the user 206, otherwise a printer busy message is presented to the user 207. At this point the local copy operation is complete and keystroke monitoring 200 continues.

FIG. 3 describes the high level control flow of the system wide local copy management operation.

Thus it will be appreciated that the described preferred system allows a local copy function to be performed in a distributed network in which terminals can be logically in session with (running applications on) a remote processor. The I/O module acts as a virtual terminal which intercepts print requests from real terminals and passes these requests on the VTAM Local Copy Server for processing. The server application provides the data formatting and routing necessary to implement the local copy function. As printers on the system are used "as needed" they must be left available for use as needed when they are not being used. However, the Local Copy Manager permits usage, by incorporating an internal queue mechanism that allows for several print requests to be pending from each terminal.

The requests are handled on a serial basis. Appropriate status signals are provided for use by the operator.

Clearly, the inventions we have described provide a basis for potential growth and development. Accordingly, it will be understood that those skilled in the art after reviewing our presently contemplated mode of practicing the inventions, both now and in the future, will envision further improvements and enhancements to our inventions, and these should be understood to be intended to be within the scope of the following claims which are to be construed to protect the proper rights of an inventor.

What is claimed is:

1. A computer system comprising:

a main processor, an I/O processor, a plurality of control units attached to said I/O processor, a printer attached at least one of said control units, a plurality of display stations attached to another of said control units, means for reading a display station's screen data and for formatting said screen data into a print job and for routing the print job data to said printer, characterized by a local copy manager I/O processor microcode means for emulating a display system, said local copy manager I/O microcode means including:

means for monitoring the activity of each display station coupled to said I/O processor, and means for intercepting all print keys for each display computer system, and means for capturing screen data for each terminal station, and means for interrupting said system main processor with a request for print job service;

said local copy manager I/O microcode means maintaining a personal unique channel and device address with said main system processor, whereby terminal stations print screen requests are routed by said local copy manager I/O microcode means to the said printer.

2. A computer system according to claim 1 wherein there is provided a plurality of terminal units for each main processor.

3. A computer system according to claim 1 wherein there is provided a plurality of printer units for the system, and wherein said an operator may designate which printer is to be the point of hard copy output of the terminal unit.

4. A computer system according to claim 1 wherein there is provided a plurality of I/O processor control units for a main processor, and wherein each I/O processor executes local copy manager I/O microcode means and monitors all display station attached to the I/O processor.

5. A computer system according to claim 1 wherein the local copy manager I/O means captures a requesting terminal display station's image, and presents the screen image to the main processor as if it were a display station emulated by the local manager I/O microcode means had its own print key depressed.

6. A computer system according to claim 1 wherein the system emulated display station has been defined with its terminal control table set up with a "PRINT TO" printer defined, and system programming is used to format the screen data into a print job and route it to a printer.

7. The computer system according to claim 1 further including means for routing screen data to any printer of the system defined in a PAM, and in a distributed network, with a print to printer defined in an application.

* * * * *